Dec. 26, 1961  W. P. MANSFIELD  3,014,468
INTERNAL COMBUSTION ENGINES AND PISTONS THEREFOR
Filed Oct. 6, 1960  2 Sheets-Sheet 1

Inventor
W. P. Mansfield

Dec. 26, 1961  W. P. MANSFIELD  3,014,468
INTERNAL COMBUSTION ENGINES AND PISTONS THEREFOR
Filed Oct. 6, 1960  2 Sheets-Sheet 2

Inventor
W. P. Mansfield
Attys

United States Patent Office 3,014,468
Patented Dec. 26, 1961

3,014,468
INTERNAL COMBUSTION ENGINES AND PISTONS THEREFOR
Wilfred Percival Mansfield, Slough, England, assignor to The British Internal Combustion Engine Research Association, Slough, England
Filed Oct. 6, 1960, Ser. No. 60,864
Claims priority, application Great Britain Oct. 9, 1959
3 Claims. (Cl. 123—48)

This invention relates to internal combustion engines and pistons therefor and in particular to a method and to means for varying the clearance volume in a cylinder of a two stroke cycle internal combustion engine with the object of increasing the efficiency of said engine.

The invention consists in a piston for a two stroke internal combustion engine in which at least part of the crown is capable of limited relative movement in relation to the means for converting reciprocating movement of the piston into rotary motion of the engine output shaft, characterised in that the movement in the direction to decrease the clearance volume is caused by the storage of energy produced by the pressure of a fluid when the piston is around top dead centre and the use of said stored energy during the lower part of the piston stroke to effect said movement.

The invention further consists in that the energy is stored in an accumulator and the said crown portion is provided with a fluid chamber into which fluid is introduced to cause said movement by its release from said accumulator.

The invention still further consists in that the chamber is provided with a pressure relief valve which permits discharge of fluid when the pressure in the chamber exceeds a predetermined maximum value.

In the common design of a piston type internal combustion engine, the volumetric compression and expansion ratios are fixed. Improved performances can be obtained by adjusting the ratios in accordance with the engine load.

In accordance with the invention there is provided means whereby the compression and expansion ratios of an engine are automatically varied mainly in accordance with the maximum gas pressure acting on the piston, thereby to obtain at each condition of operation of the engine the highest permissible compression and expansion ratios. To this end a self-adjusting piston is used in place of the normal piston. The piston comprises at least two parts or portions, one of which is connected to the small end of the connecting rod by any of the known means while the other, which forms part of the boundary of the combustion chamber, is movable in relation to the first part, in such a way as to change the clearance volume. The required movement is controlled by the passage of oil (which may be taken from the normal pressure lubricating oil system of the engine), into and out of a chamber formed between the two parts of the piston. These movements of the oil are controlled by non-return inlet valves and spring-loaded discharge valves and/or discharge orifices arranged and adjusted to give the required changes in position of the adjustable part of the piston in accordance with the engine load.

The accompanying drawings show, by way of example only, embodiments of the invention in which.

In certain engines, and particularly those having piston controlled ports, in which it is desired that the timing should not vary with the variations of the piston, and in those in which it is desired to have a constant relationship between the rim of the crown of the piston and the cylinder head at top dead centre, in order to promote air movement, it is advantageous to arrange that only the centre portion of the piston crown moves to adjust the ratios.

Figure 1:
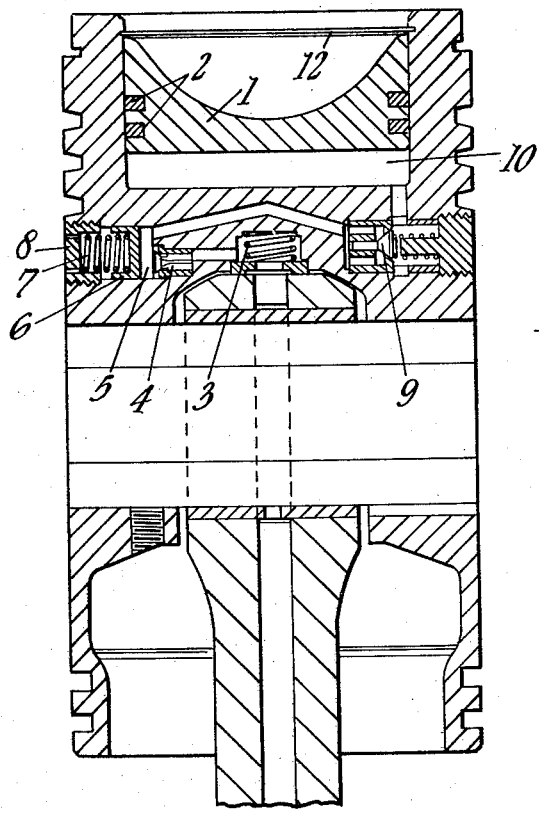
FIGURE 1 shows a cross-section through a variable ratio piston of the type in which a portion only of the piston crown moves to vary the ratios.

The portion of the piston which moves relative to the gudgeon pin to vary the ratio is a supplementary piston 1 with sealing rings 2 which move in a bore in the main piston body. As the resultant of gas and inertia forces on the supplementary piston is always a force in the direction of the gudgeon pin (except at extremely high engine speeds), no provision is required to restrain upward movement. The limited upward movement required on each cycle is obtained in the following manner. The high pressure developed in the space 3 around top dead centre as a result of the inertia of the column of oil in the connecting rod causes oil to flow past the non-return valve 4 into the space 5, moving the accumulator piston 6 against the force of the spring 7 to the stop 8. During the lower part of the piston stroke, the inertia force of the oil column acts downwards, valve 4 closes and as the gas pressure on the supplementary piston diminishes, the accumulator piston moves to the right discharging a volume of oil, equal to the accumulator piston area $x$ stroke, via the feed valve 9 into the oil chamber 10 producing the required upward movement of the piston. Two spring-loaded valves 11 are shown in the lower view of FIGURE 1, via which oil is discharged from the chamber 10 when the cylinder pressure momentarily exceeds the selected maximum values.

Figure 3:
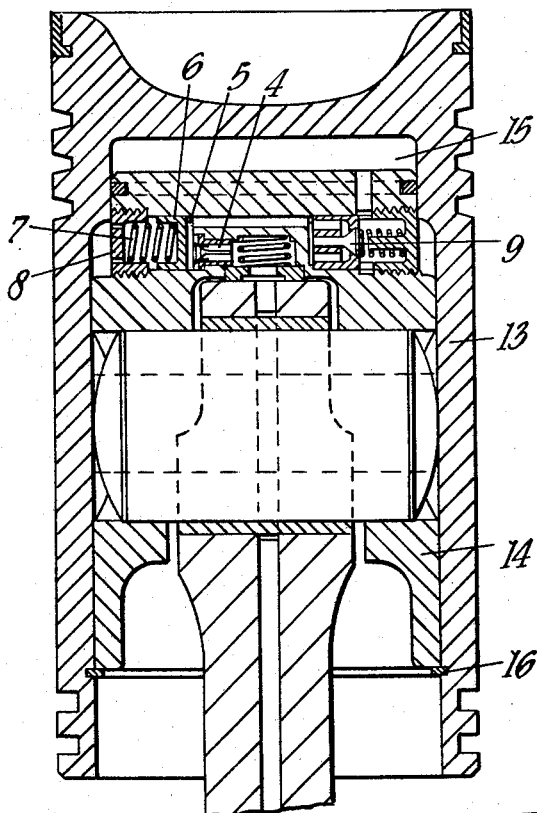
FIGURE 3 shows a cross-section through a variable ratio piston of the type in which the whole of the crown of the piston moves to vary the ratios.
Figure 4:
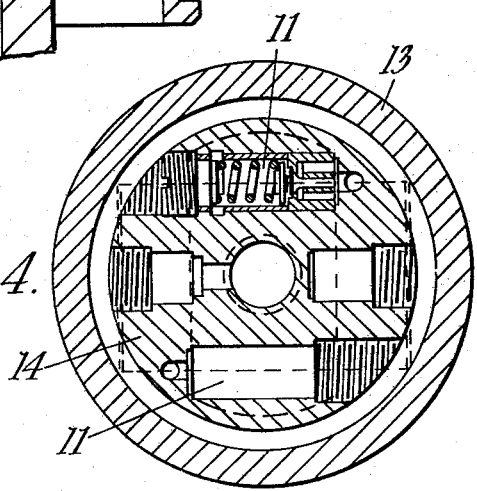
FIGURE 4 shows a plan view of the piston of FIGURE 3.

The piston 1 which is free of mechanical stress can be made of a ceramic material, thereby eliminating the need for any other form of heat barrier between the combustion chamber and the oil space 10. The circlip 12 is one way of ensuring that the supplementary piston 1 cannot leave its bore. An alternative way is to fit an annular plate to the top of the piston slightly overlapping the supplementary piston bore. This plate can be used also to carry or to secure the fire-ring shown. As an alternative, FIGURES 3 and 4 show an arrangement in which the whole of the crown of the piston moves to vary the ratios.

Figure 2:
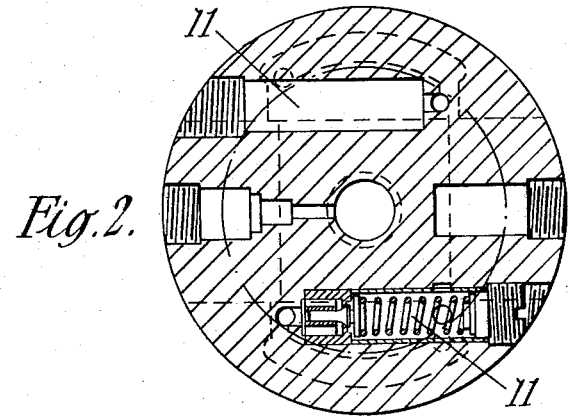
FIGURE 2 shows a plan view of the piston of FIGURE 1.

In this embodiment, the outer portion 13 of the piston forms the crown, ring belt, and skirt, while the inner portion 14 forms the gudgeon pin carrier. These two portions form between them the oil chamber 15, which functions as described for chamber 10 of FIGURE 1. The desired maximum upward movement of the outer portion 13 of the piston is set by the circlip 16. The arrangement and functioning of the valves and of the accumulator is the same as described in relation to FIGURES 1 and 2.

The supply of oil to the piston is by way of a channel shown in dotted line in the piston rod, and is either a timed supply or an automatic non-return valve is provided in the supply line to prevent return flow of oil down the rod due to inertia forces.

It is to be understood that the above description is by way of example only and that details for carrying the invention into effect may be varied without departing from the scope of the invention claimed.

I claim:
1. A piston for a two-stroke internal combustion engine, said piston comprising a first main part and a second main part axially movable with respect to said first main part, said first main part forming at least part of the crown of the piston, means for connecting said second main part to a connecting rod, a first chamber between said main parts, a second chamber within said second main part, a plunger in said second chamber, a compression spring for urging said plunger in a direction to reduce the volume of said second chamber, a first passage in said second main part for conducting fluid from a passage in the connecting rod to said second chamber, a non-return valve in said first passage, a second passage in said second main part for conducting fluid from said second chamber to said first chamber, a non-return valve in said second passage, a third passage in said second main part for conducting fluid from said first chamber to the exterior of said piston at the end opposite the crown and a spring loaded pressure relief valve in said third passage to control flow of fluid from said first chamber.

2. A piston as defined in claim 1 in which said first main part forms the entire crown of the piston.

3. A piston as defined in claim 1, in which said second main part is provided with an axially disposed recess open at the crown end of the piston, said first main part comprising a supplementary piston slidably received in said recess with the space between said supplementary piston and the closed end of said recess providing said first chamber.

References Cited in the file of this patent

UNITED STATES PATENTS

| | | |
|---|---|---|
| 1,825,163 | Schweter | Sept. 29, 1931 |
| 2,104,802 | Hansen | Jan. 11, 1938 |
| 2,170,266 | Leissner | Aug. 22, 1939 |
| 2,742,027 | Mansfield | Apr. 17, 1956 |